United States Patent
Musil et al.

(10) Patent No.: US 10,052,694 B2
(45) Date of Patent: Aug. 21, 2018

(54) APPARATUS AND METHOD FOR COOLING A CUTTING TOOL USING SUPER CRITICAL CARBON DIOXIDE

(71) Applicant: Kennametal Inc., Latrobe, PA (US)

(72) Inventors: John C. Musil, Mantua, OH (US); Christopher Bukvic, Chesterland, OH (US)

(73) Assignee: KENNAMETAL INC., Latrobe, FL (US)

( * ) Notice: Subject to any disclaimer, the term of this patent is extended or adjusted under 35 U.S.C. 154(b) by 261 days.

(21) Appl. No.: 15/146,579

(22) Filed: May 4, 2016

(65) Prior Publication Data
US 2017/0320141 A1    Nov. 9, 2017

(51) Int. Cl.
*B23B 27/10* (2006.01)
*B23Q 11/10* (2006.01)
*B23B 27/16* (2006.01)

(52) U.S. Cl.
CPC .......... *B23B 27/10* (2013.01); *B23B 27/1666* (2013.01); *B23Q 11/1053* (2013.01); *B23B 2205/12* (2013.01); *B23B 2250/12* (2013.01)

(58) Field of Classification Search
CPC ... B23B 27/10; B23B 27/1625; B23B 27/166; B23B 2205/12; B23B 2250/12; Y10T 407/2272; Y10T 407/14
See application file for complete search history.

(56) References Cited

U.S. PATENT DOCUMENTS

| | | |
|---|---|---|
| 5,311,654 A | 5/1994 | Cook |
| 5,378,091 A | 1/1995 | Nakamura |
| 5,439,327 A | 8/1995 | Wertheim |
| 5,901,623 A * | 5/1999 | Hong ............... B23B 27/10 407/100 |
| 6,045,301 A | 4/2000 | Kammermeier et al. |
| 6,379,087 B1 * | 4/2002 | Alexander, IV .... B23B 27/1651 407/105 |
| 7,104,171 B1 | 9/2006 | Long |
| 7,547,163 B2 * | 6/2009 | Morrison ............ B23B 27/1677 407/103 |
| 8,727,674 B2 * | 5/2014 | Baca, Jr. ............... B23B 27/164 407/106 |

(Continued)

FOREIGN PATENT DOCUMENTS

DE    42 38 412 A1    5/1994
DE    197 37 104 A1    3/1999
(Continued)

OTHER PUBLICATIONS

GB 1705803.3 Search Report dated Jul. 28, 2017, 5 pages.
Mar. 23, 2018 Search Report.

*Primary Examiner* — Will Fridie, Jr.
(74) *Attorney, Agent, or Firm* — Larry R. Meenan

(57) ABSTRACT

A toolholder includes a pocket assembly having a nest section and a clamp section. An inverted nest is mounted in the nest section and includes an insert-receiving pocket for accommodating a cutting insert mounted therein. A clamping wedge is mounted in the clamp section in such a way that the cutting insert engages the clamping wedge. The inverted nest includes one or more coolant grooves that cooperate with the cutting insert for directing super critical carbon dioxide to a cutting tool/workpiece interface.

17 Claims, 8 Drawing Sheets

(56) References Cited

U.S. PATENT DOCUMENTS

| | | | |
|---|---|---|---|
| 8,985,913 B2* | 3/2015 | Oren | B23B 29/043 407/11 |
| 2009/0320655 A1 | 12/2009 | Grant | |
| 2010/0086373 A1 | 4/2010 | Kleiner | |
| 2010/0196105 A1* | 8/2010 | Amstibovitsky | B23B 27/10 407/11 |
| 2010/0209206 A1* | 8/2010 | Holwerk | B23B 27/1666 408/240 |
| 2010/0272529 A1 | 10/2010 | Rozzi et al. | |
| 2011/0020073 A1 | 1/2011 | Chen et al. | |
| 2011/0299944 A1 | 12/2011 | Hofermann | |
| 2012/0087747 A1 | 4/2012 | Fang et al. | |
| 2012/0141216 A1* | 6/2012 | Zitzlaff | B23B 27/1625 407/107 |
| 2013/0202372 A1* | 8/2013 | Hecht | B23B 27/10 407/107 |
| 2014/0321926 A1* | 10/2014 | Sadikov | B23B 27/10 407/11 |
| 2015/0050097 A1 | 2/2015 | Haimer | |
| 2015/0290716 A1* | 10/2015 | Herberth | B23B 25/02 407/11 |

FOREIGN PATENT DOCUMENTS

| | | |
|---|---|---|
| EP | 0258066 | 8/1989 |
| EP | 1 961 487 A1 | 1/2008 |
| EP | 2 865 472 A1 | 10/2014 |
| GB | 795729 A | 5/1958 |
| WO | WO9605008 | 2/1996 |
| WO | 2005/084947 A1 | 9/2005 |
| WO | 2006/077363 A1 | 7/2006 |
| WO | 2010/094264 A1 | 8/2010 |
| WO | WO2011005340 | 3/2011 |

* cited by examiner

US 10,052,694 B2

APPARATUS AND METHOD FOR COOLING A CUTTING TOOL USING SUPER CRITICAL CARBON DIOXIDE

FIELD OF THE INVENTION

The invention pertains to an apparatus and method for cooling a cutting tool. More particularly, the invention relates to an apparatus and method for cooling a cutting tool using super critical $CO_2$.

BACKGROUND OF THE INVENTION

These days, "going green" is a concern for many manufacturers and implementing Minimum Quantity Lubrication (MQL) with the proper lubricant is a necessary step in that direction. MQL is the process of applying minute amounts of high-quality lubricant directly to the cutting insert/workpiece interface, instead of using traditional flood coolants. MQL minimizes environmental impact by significantly reducing fluid usage and eliminating the need for coolant treatment and disposal.

Unfortunately, today's metalworking fluids compromise cooling for lubrication. Add oil and you reduce cooling. Add water and you reduce lubricity. Oil-in-air minimum quantity lubrication can lubricate but doesn't cool well. Liquid nitrogen can cool but doesn't lubricate well.

Therefore, there is a need to provide an apparatus and method for cooling a cutting tool implementing MQL, while providing maximum cooling and lubrication to the cutting insert/workpiece interface.

SUMMARY OF THE INVENTION

The problem of providing maximum cooling and lubrication to the cutting insert/workpiece interface implementing MQL is solved by providing an apparatus and method for cooling a cutting tool that includes an inverted nest with at least one coolant groove that provides super critical $CO_2$ to the cutting insert/workpiece interface.

In one aspect of the invention, a toolholder comprises a pocket assembly having a nest section and a clamp section. An inverted nest is mounted in the nest section. The inverted nest includes an insert-receiving pocket for accommodating a cutting insert mounted therein. A clamping wedge is mounted in the clamp section in such a way that the cutting insert engages the clamping wedge. The inverted nest includes one or more coolant grooves that cooperate with the cutting insert for directing super critical carbon dioxide to a cutting tool/workpiece interface.

In another aspect of the invention, an inverted nest for a toolholder comprises a top surface, a bottom surface opposite the top surface and a plurality of side surfaces; and a forward nose portion with an insert-receiving pocket for accommodating a cutting insert mounted therein. The insert-receiving pocket includes a pair of side walls and a top wall to provide three-point contact between the cutting insert and the insert-receiving pocket when the cutting insert is mounted therein. The top surface of the insert-receiving pocket of the inverted nest includes one or more coolant grooves that cooperate with the cutting insert for directing super critical carbon dioxide to a cutting tool/workpiece interface.

In yet another aspect of the invention, a method for directing super critical carbon dioxide to a cutting insert/workpiece interface of a toolholder comprises the step of:

mounting an inverted nest in a nest section of a pocket assembly of a toolholder, the inverted nest including an insert-receiving pocket for accommodating a cutting insert mounted therein; and;

mounting a clamping wedge in a clamp section of the pocket assembly of the toolholder in such a way that the cutting insert engages the clamping wedge, wherein the inverted nest includes one or more coolant grooves that cooperate with the cutting insert for directing super critical carbon dioxide to a cutting tool/workpiece interface.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
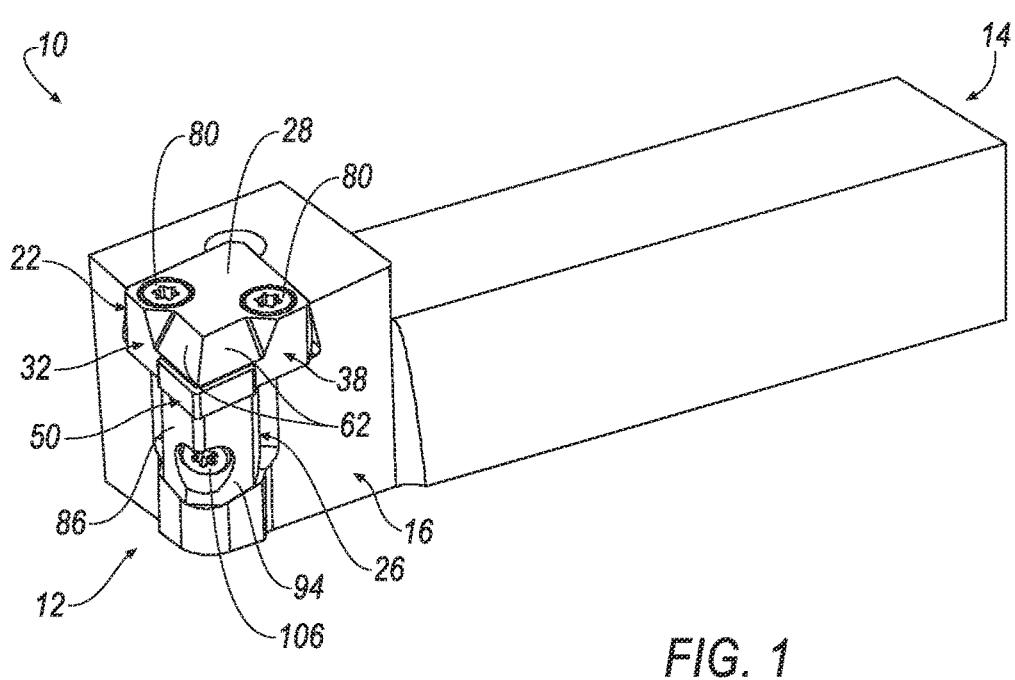
FIG. 1 is a perspective view of a cutting tool with an inverted nest with one or more grooves, a cutting insert and a clamping wedge according to an embodiment of the invention.
Figure 2:
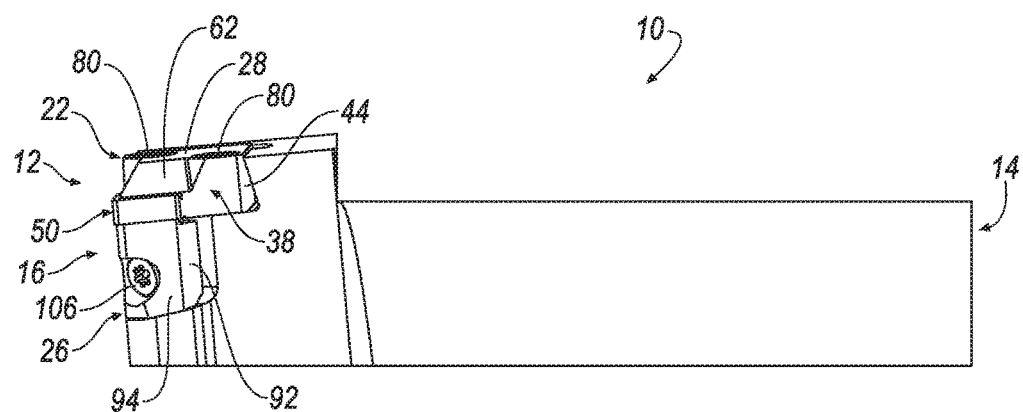
FIG. 2 is a side view of the cutting tool of FIG. 1.
Figure 3:
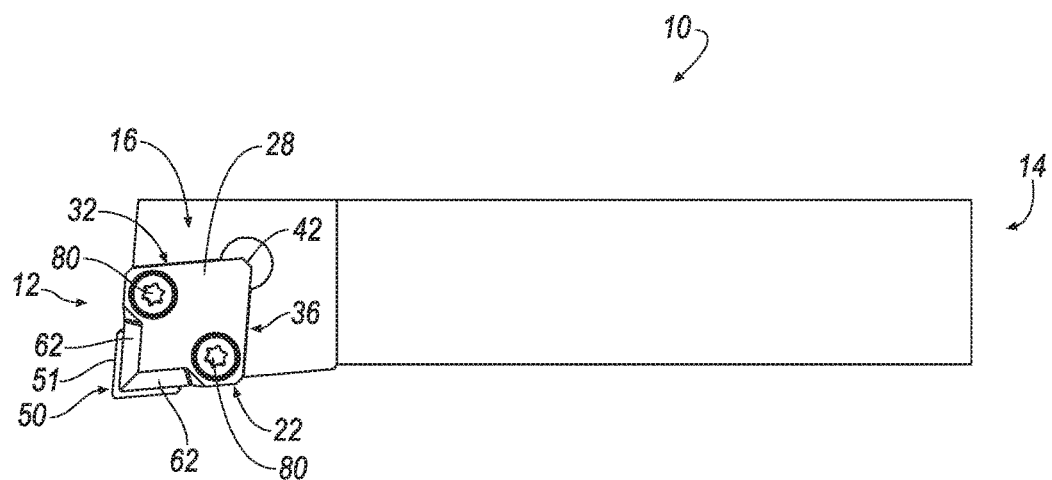
FIG. 3 is a top view of the cutting tool of FIG. 1.

Referring to the drawings wherein like reference characters designate like elements, a toolholder 10 is generally shown in FIGS. 1-4 according to an embodiment of the invention. The specific kind of toolholder 10 illustrated is designed for performing turning machining operations. However, the mention of the toolholder as a turning toolholder is not intended to restrict the scope of the invention. The kinds of a toolholder to which the invention relates includes, without limitation, any toolholder design with the capability to internally deliver coolant to the cutting insert/workpiece interface. For example, the principles of the invention can be practiced with a milling cutter, a boring tool, and the like. The true scope and spirit of the invention is indicated by the claims hereof.

Figure 4:
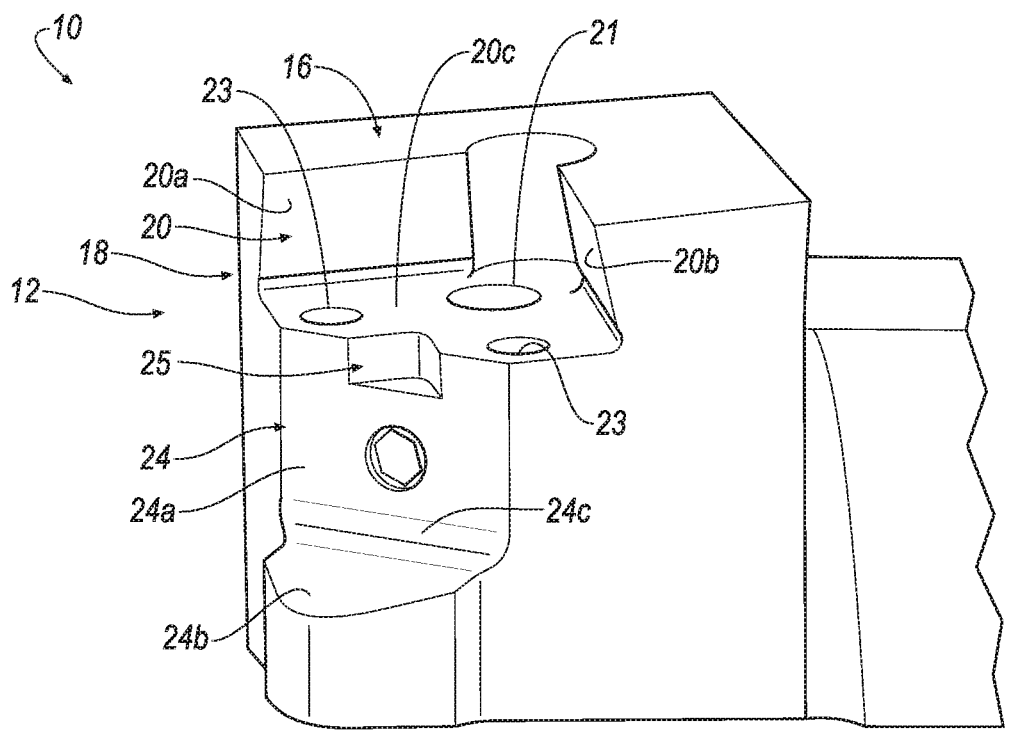
FIG. 4 is a partial perspective view of the pocket assembly of the cutting tool of FIG. 1 with the inverted nest, cutting insert and clamping wedge removed for clarity.
Figure 5:
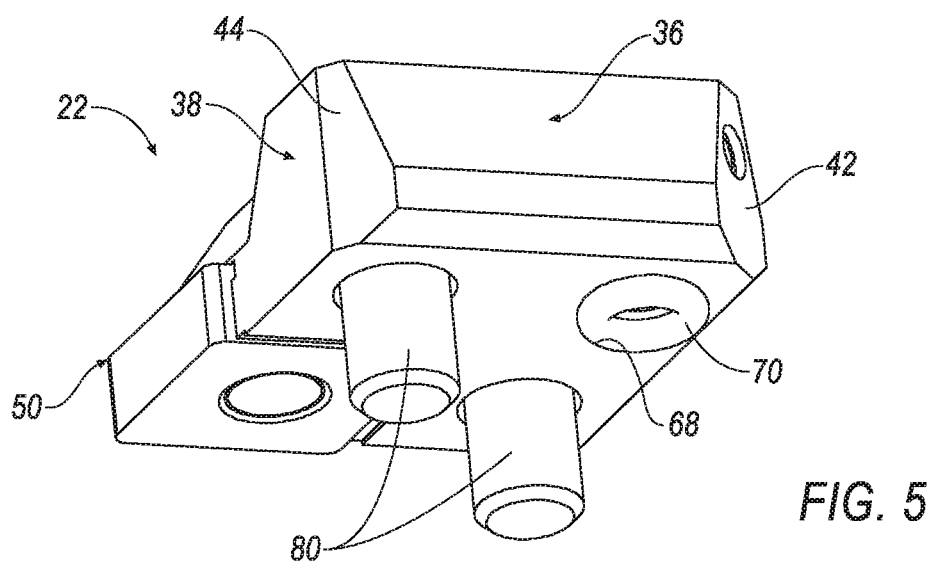
FIG. 5 is a bottom perspective view of the inverted nest with the cutting insert mounted in the insert-receiving pocket of the inverted nest according to an embodiment of the invention.
Figure 6:
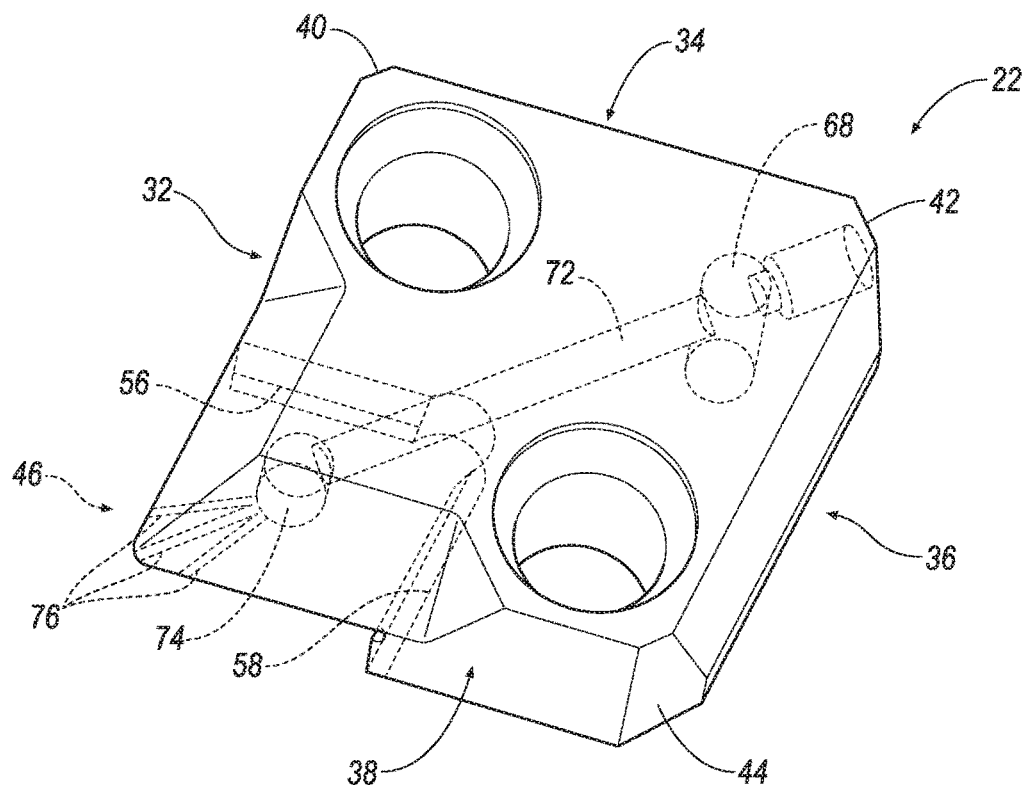
FIG. 6 is a top perspective view of the inverted nest with the insert-receiving pocket, inlet port, internal coolant passage, header and one or more grooves shown in phantom.
Figure 7:
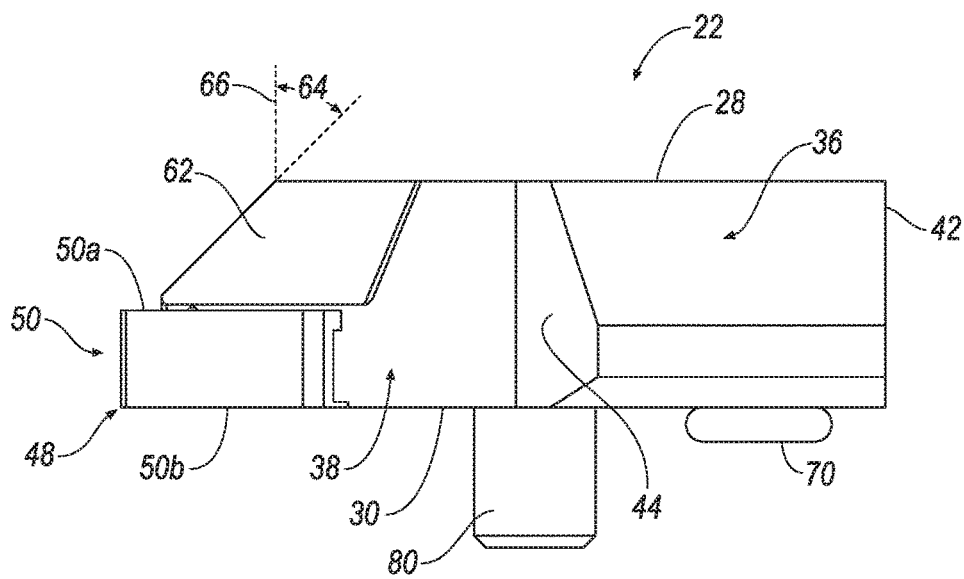
FIG. 7 is side view of the inverted nest and cutting insert shown in FIG. 5.
Figure 8:
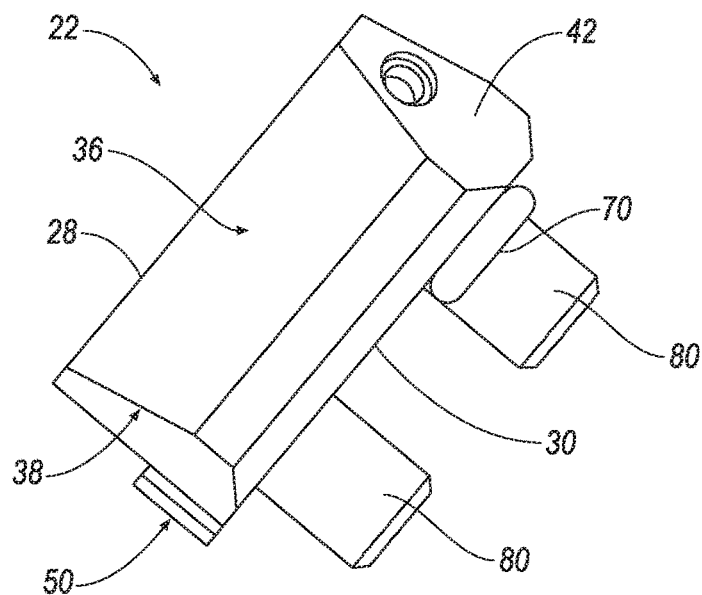
FIG. 8 is another side view of the inverted nest and cutting insert shown in FIG. 5.
Figure 9:
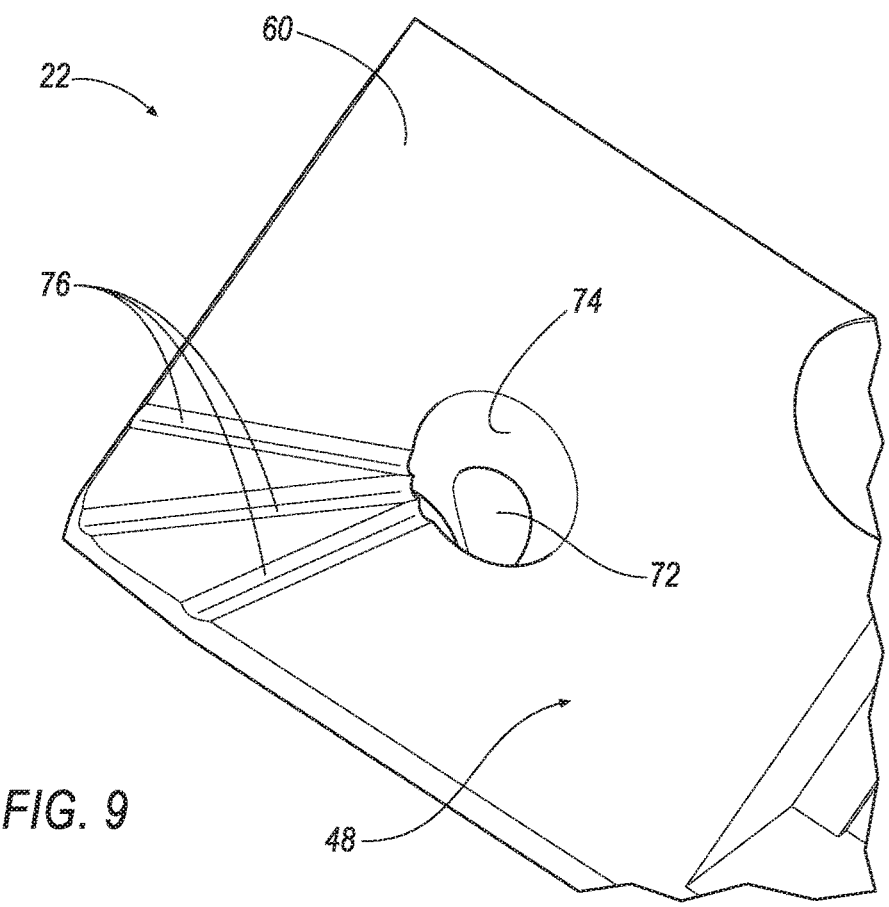
FIG. 9 is an enlarged bottom view of the insert-receiving pocket of the inverted nest showing the one or more grooves, header and internal coolant passage according to an embodiment of the invention.

In general, the toolholder 10 has an axial forward end 12 and an axial rearward end 14. As shown in FIG. 4, the toolholder 10 has a head portion 16 at the axial forward end 12 with a pocket assembly, shown generally at 18. The pocket assembly 18 has a nest section 20 for accommodating an inverted nest 22 and a clamp section 24 for accommodating a clamping wedge 26. The nest section 20 has a pair of side walls 20a, 20b and a bottom wall 20c. A corner relief 20d may be formed between the side walls 20a, 20b to provide clearance for the inverted nest 22 when mounted therein. The bottom wall 20c of the nest section 20 includes a coolant port 21 that is in fluid communication with a source of coolant (not shown) and at least one threaded opening 23 for securing the inverted nest 22 to nest section 20 of the pocket assembly 18.

The clamp section 24 includes a rear wall 24a and a bottom wall 24b for supporting the clamping wedge 26 when mounted therein. A radius 24c may be formed between the rear wall 24a and the bottom wall 24b to provide clearance for the clamping wedge 26 when mounted therein. An upper portion of the rear wall 24a has a clearance 25 for accommodating cutting inserts having varying thickness when the inverted nest 22 is mounted in the pocket assembly 18 of the toolholder 10.

Referring now to FIGS. 5-11, the inverted nest 22 is generally diamond-shaped having a substantially planar top surface 28, a substantially planar bottom surface 30 opposite the top surface 28 and four side surfaces, shown generally at 32, 34, 36, 38. The inverted nest 22 also includes a side faceted surface 40 at the intersection of the side surfaces 32, 34, a rearward faceted surface 42 at the intersection of the side surfaces 34, 36 and a side faceted surface 44 at the intersection of the side surface 36, 38. In the illustrated embodiment, the side faceted surface 40 is opposite the side faceted surface 44.

The inverted nest 22 includes a forward nose portion 46 with an insert-receiving pocket, shown generally at 48, for accommodating a cutting insert 50 mounted therein. In the illustrated embodiment, the side surfaces 32, 38 of the nose portion 46 are formed at an angle 52 of about forty (40) degrees with respect to a longitudinal axis 54 that bisects the rearward faceted surface 42 and the forward nose portion 46. Because the inverted nest 22 is mirror symmetric about the longitudinal axis 54, the side surfaces 32, 34 are formed at an angle of about fifty (50) degrees with respect to an axis that is substantially perpendicular to the longitudinal axis 54. It will be appreciated that the invention is not limited by the diamond shape of the inverted nest 22, and that the invention can be practiced with any desirable shape, such a triangular, circular, and the like.

The insert-receiving pocket 48 includes a pair of side walls 56, 58 and a top wall 60 to provide three-point contact between the cutting insert 50 and the insert-receiving pocket 48 when the cutting insert 50 is mounted therein. In the illustrated embodiment, the cutting insert 50 is generally diamond in shape, and specifically the cutting insert 50 has an eighty (80) degree diamond shape of a type well-known in the art. That is, the two opposite corners of the cutting insert 50 are formed at an angle of eighty (80) degrees with respect to each other, and the other two opposite corners of the cutting insert 50 are formed at an angle of one-hundred (100) degrees with respect to each other. However, it will be appreciated that the invention is not limited by the specific shape of the insert-receiving pocket 48 and that the insert-receiving pocket 48 can have any desirable shape in order to accommodate the cutting insert 50. For example, the insert-receiving pocket 48 can have a generally round shape for accommodating a generally round cutting insert. In another example, the insert-receiving pocket 48 can have a generally triangular shape for accommodating a generally triangular cutting insert.

The inverted nest 22 also includes an angled surface 62 extending downward from the top surface 28 to the insert-receiving pocket 48. The angled surface 62 assists on the evacuation of chips during a machining operation. In one embodiment, the angled surface 62 is formed at an angle 64 of between about thirty (30) degrees to about sixty (60) degrees with respect to a vertical plane 66 that is substantially perpendicular to the longitudinal axis 54. The bottom surface 30 includes a coolant inlet port 68 for introducing coolant into the inverted nest 22. A sealing member 70, such as an O-ring, may be used to provide a seal for the coolant inlet port 68.

Figure 12:
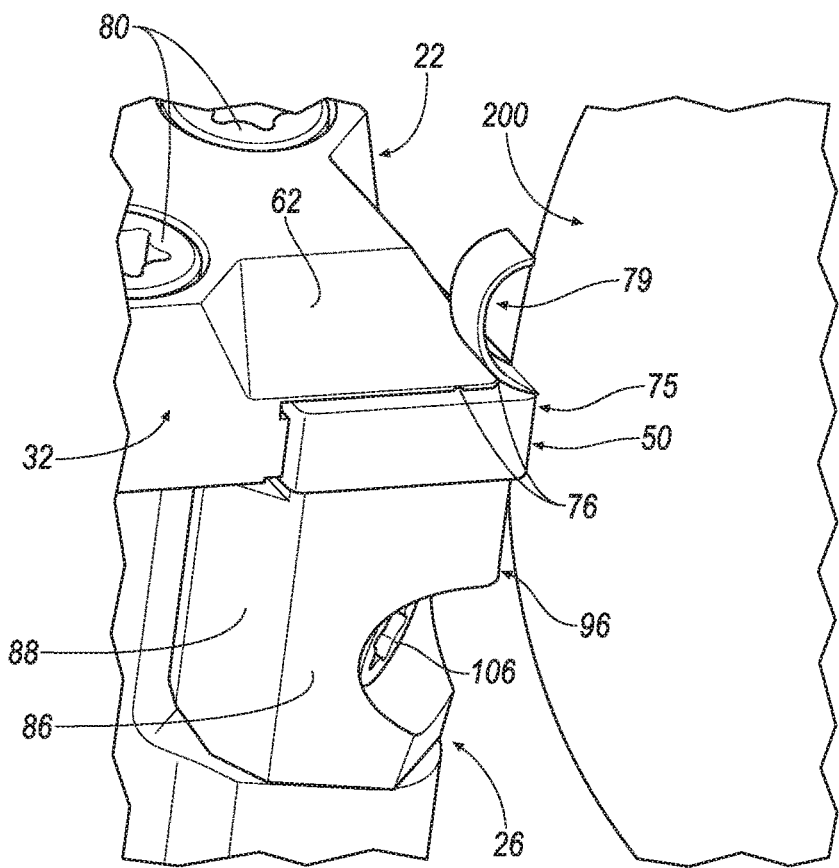
FIG. 12 is an enlarged view of the cutting insert/workpiece interface showing the coolant being delivered to an underside of a chip during a machining operation.
Figure 13:
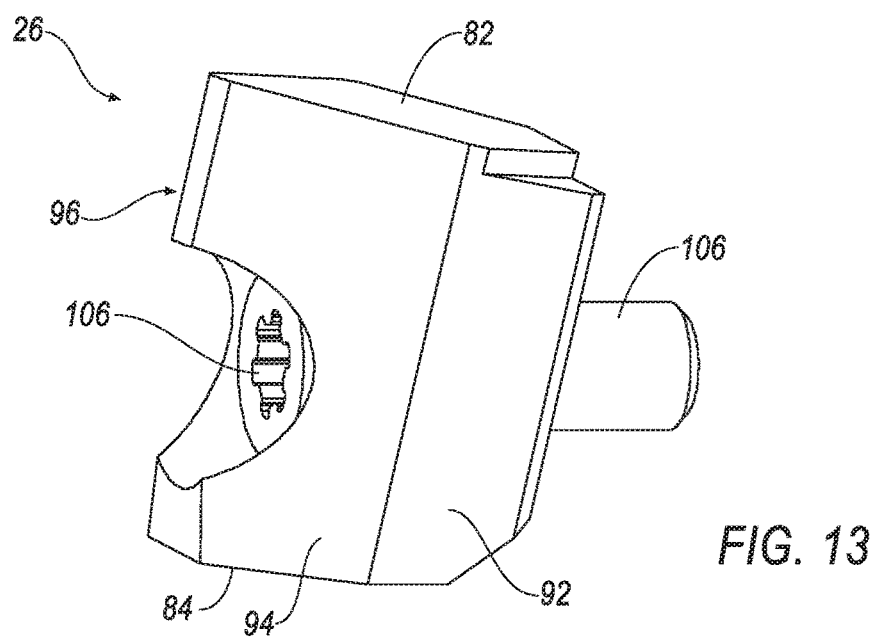
FIG. 13 is a perspective view of the clamping wedge according to an embodiment of the invention.

The inverted nest 22 also includes an internal coolant passage 72 extending from the coolant inlet port 68 to a header 74 in the forward nose portion 46 of the inverted nest 22. The header 74 provides for a uniform distribution of the coolant exiting the inverted nest 22. The top surface 60 of the insert-receiving pocket 48 of the inverted nest 22 includes one or more grooves 76 extending from the header 74 to the nose portion 46 proximate an interface 75 between the cutting insert 50 and a workpiece 200 (FIG. 12). In the illustrated embodiment, the top surface 60 of the insert-receiving pocket 48 of the inverted nest 22 has three grooves 76, one groove 76 lying on the longitudinal axis 54 and two grooves 76 on opposite sides of the longitudinal axis 54. However, it will be appreciated that the invention is not limited by the number of grooves 76 formed in the top surface 30 of the insert-receiving pocket 48 of the inverted nest 22, and that the invention can be practiced with any desirable number of grooves 76 (i.e. one or more grooves 76).

Figure 10:
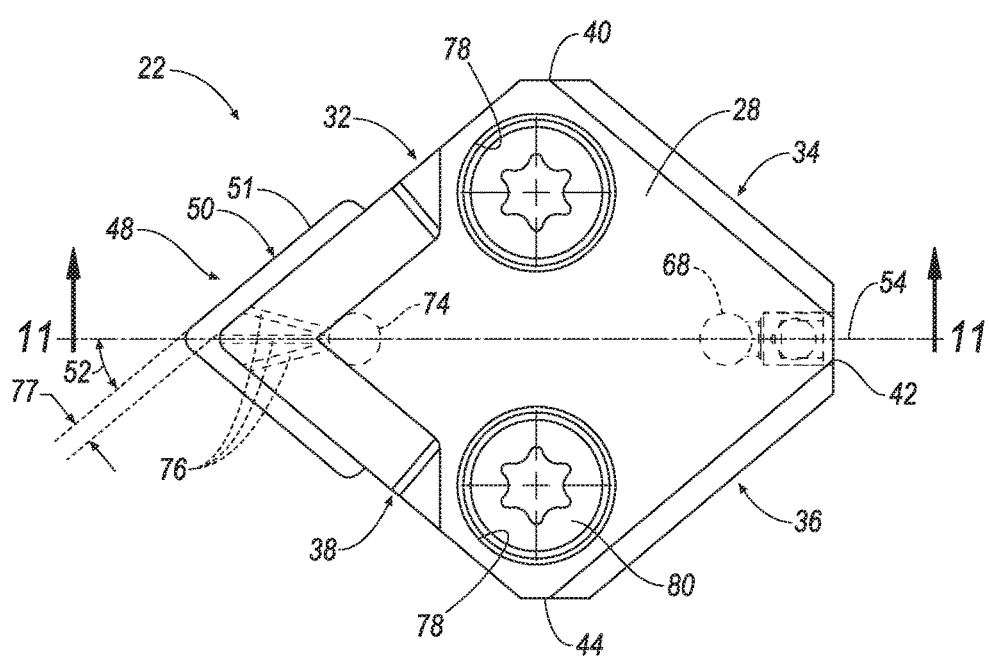
FIG. 10 is a top view of the inverted nest of FIG. 5.
Figure 11:
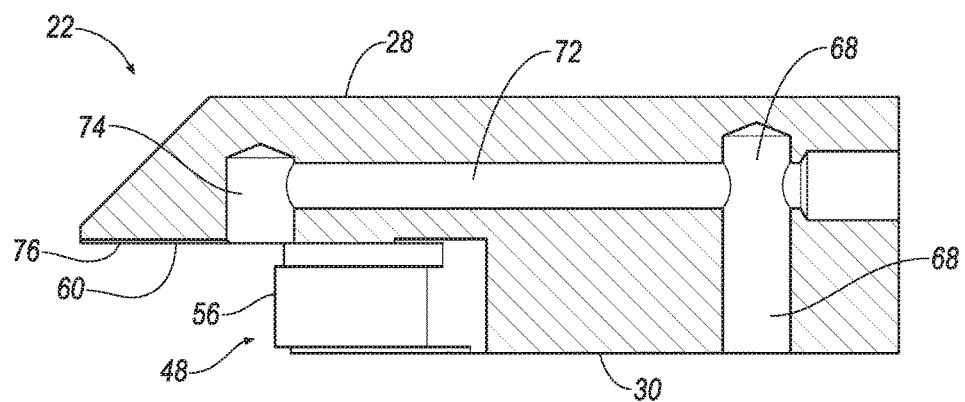
FIG. 11 is a cross sectional view of the inverted nest taken along line 11-11 of FIG. 10.

It should be noted that the top surface 50a of the cutting insert 50 cooperates with the one or more grooves 76 to form an enclosed coolant passage extending from the header 74 to the cutting insert/workpiece interface. In one embodiment, the enclosed coolant passage formed by the one or more grooves 76 cooperating with the top surface 50a of the cutting insert 50 has an effective diameter of between about 0.006 in (0.152 mm) to about 0.010 in (0.254 mm). As shown in FIG. 10, a small distance 77 exists between the cutting edges 51 of the cutting insert 50 and the side surfaces 32, 38 and the nose portion 46 of the inverted nest 22. This small distance 77 enables the coolant that exits the inverted nest 22 to be directed to the underside of the chip 79 so as to not impede the chip flow, but to aid in the evacuation of chips from the cutting insert/workpiece interface 75 during a machining operation, as shown in FIG. 12.

It will be appreciated that the cutting insert 50 can be an indexable cutting insert. As such, the cutting insert 50 can be indexed in the insert-receiving pocket 48 of the inverted nest 22 in such a way that the top surface 50a becomes a bottom surface 50b that contacts the clamping wedge 26, and the bottom surface 50b becomes the top surface 50a that contacts the inverted nest 22.

In one embodiment, the one or more grooves 76 are substantially V-shaped and the top surface 50a of the cutting insert 50 is substantially planar. In this embodiment, the enclosed coolant channel formed by the top surface 50a of the cutting insert 50 and the one or more grooves 76 has a substantially triangular-shaped cross section. In another embodiment, the one or more grooves 76 are substantially U-shaped and the top surface 50a of the cutting insert 50 is substantially planar. In this embodiment, the enclosed coolant channel formed by the top surface 50a of the cutting insert 50 and the one or more grooves 76 has a substantially D-shaped cross section. It will be appreciated that the invention is not limited by the shape of the one or more grooves 76 and the top surface 50a of the cutting insert 50 being substantially planar, and that the invention can be practiced with any desirable shape that provides a sufficient flow of coolant to the cutting insert/workpiece interface so long as the one or more grooves 76 cooperate with the top surface 50a of the cutting insert 50 to form an enclosed coolant passage extending from the header 74 to the cutting insert/workpiece interface.

In the illustrated embodiment, the coolant provided to the cutting insert/workpiece interface comprises supercritical carbon dioxide (CO2) commercially available from Fusion Coolant Systems, Detroit, Mich. (www.fusioncoolant.com). Supercritical carbon dioxide flows to the point of machining as a single phase system and is released from high pressure, producing a strong cooling effect and delivering dry, or enhanced liquid lubrication. Any suitable lubricant can be added to the supercritical carbon dioxide to provide additional lubrication. In either lubrication mode, dry or enhanced liquid, clean and dry chips are produced. The use of supercritical carbon dioxide has several advantages as compared to systems that use, for example, liquid nitrogen. These advantages include, but are not limited to: 1) the use of supercritical carbon dioxide does not require re-circulation or disposal of the metal working fluid; 2) a lubricant on its own that is as effective as a semi-synthetic metal working fluid; 3) an excellent that can, in enhanced mode, provide straight-oil levels of lubrication; 4) allows higher cooling and higher lubricity with higher pressure, leading to higher productivity; 5) does not clog; and 6) lowers operational costs.

As mentioned above, the supercritical carbon dioxide produces a strong cooling effect. In one embodiment, the supercritical carbon dioxide is delivered to the cutting insert/workpiece interface at a temperature of about −78 degrees F. and a pressure of between about 1450 psi to about 2100 psi. Test results have shown that the use of supercritical carbon dioxide offers a multitude of cost saving benefits for less operating capital than conventional cutting fluids. In addition, the use of supercritical carbon dioxide promotes a healthy work environment because it is bacteria free, often eliminates post-machine cleaning steps and has minimal environmental impact.

The inverted nest 22 includes at least one countersunk bore 78 extending from the top surface 28 to the bottom surface 30 for allowing a threaded fastener 80 to pass therethrough. In the illustrated embodiment, the inverted nest 22 has two countersunk bores 78 on opposite sides and equidistant to the longitudinal axis 54. It should be noted that the threaded fastener 80 is received in the at least one threaded opening 23 formed in the bottom wall 20c of the nest section 20 of the pocket assembly 18 to mount and secure the inverted nest 22 therein.

Referring now to FIGS. 13-16, the clamping wedge 26 is substantially polygonal in shape having a substantially planar top surface 82, a substantially planar bottom surface 84 opposite the top surface 82 and a plurality of side surfaces, shown generally at 86, 88, 90, 92, 94. In addition, the clamping wedge 26 includes a forward nose portion 96.

In the illustrated embodiment, the top surface 82 has a truncated diamond shape such that the side surfaces 86, 94 of the nose portion 96 are formed at an angle 98 of about forty (40) degrees with respect to a longitudinal axis 100 that bisects the forward nose portion 96 and the rear side surface 90 opposite the forward nose portion 96. Thus, the nose portion 96 of the clamping wedge 26 has the same general shape as the nose portion 46 of the inverted nest 22. Similarly, the clamping wedge 26 is mirror symmetric about the longitudinal axis 100.

Figure 14:
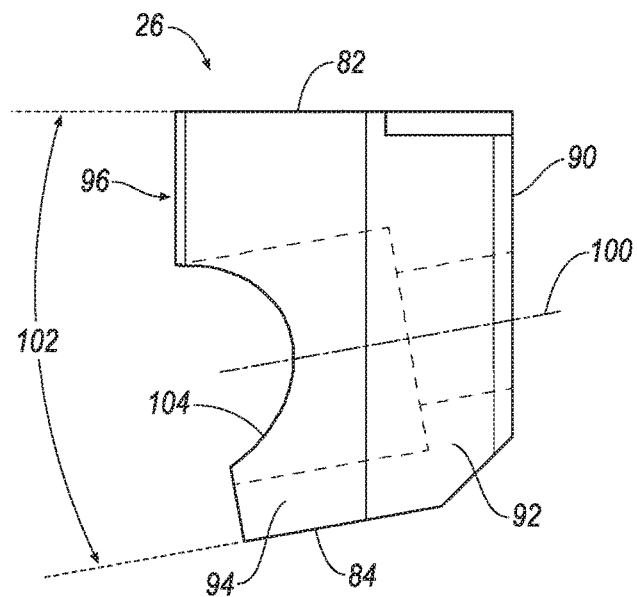
FIG. 14 is a side view of the clamping wedge of FIG. 13.
Figure 15:
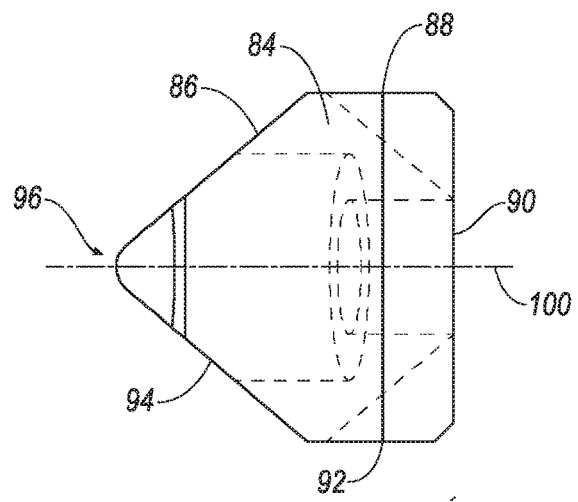
FIG. 15 is a bottom view of the clamping wedge of FIG. 13.
Figure 16:
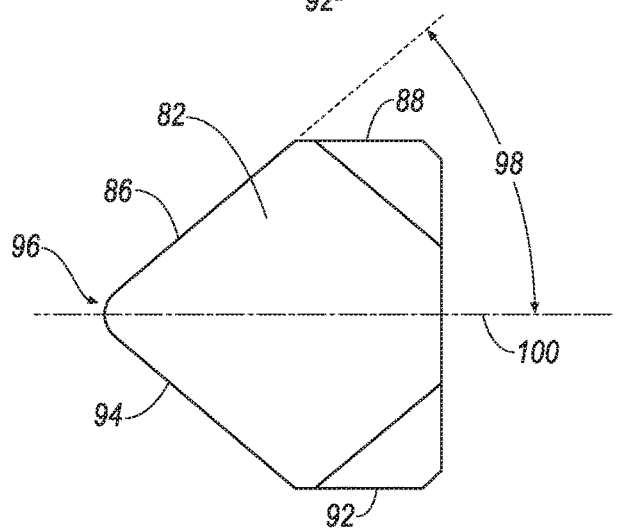
FIG. 16 is a top view of the clamping wedge of FIG. 13.

As shown in FIG. 14, the top surface 82 and the bottom surface 84 are not parallel to each other, but are formed at a positive angle 102 of between about five (5) degrees and about fifteen (15) degrees. In one embodiment, the angle 102 is about ten (10) degrees. The clamping wedge 26 includes a countersunk bore 104 extending from the nose portion 96 to the rear side surface 90 for allowing a threaded fastener 106 to pass therethrough. It should be noted that the threaded fastener 106 is received in a threaded opening 24c formed in the rear wall 24a of the wedge section 24 of the pocket assembly 18 to mount and secure the clamping wedge 26 therein. The positive angle 102 between the top and bottom surfaces 82, 84 causes the clamping wedge 26 to exert an upward force against the cutting insert 50 such that the cutting insert 50 is securely held in the insert-receiving pocket 48 of the inverted nest 22 when the clamping wedge 26 is mounted in the wedge section 24 of the pocket assembly 18.

Referring back to FIGS. 1 and 2, the cutting insert 50 is securely mounted in the insert-receiving pocket 48 of the inverted nest 22 only be the upward force exerted by the clamping wedge 26 against the cutting insert 50. Specifically, the top surface 82 of the clamping wedge 26 contacts the bottom surface 50b of the cutting insert 50 and the top surface 50a of the cutting insert 50 contacts the side surfaces 56, 58 and the top surface 60 of the insert-receiving pocket 48 of the inverted nest 22. Once mounted in the insert-receiving pocket 48 of the inverted nest 22, the supercritical carbon dioxide coolant is directed to the underside of the chip 79 at the cutting insert/workpiece interface 75 so as to assist in the evacuation of chips during a machining operation.

The patents and publications referred to herein are hereby incorporated by reference.

Having described presently preferred embodiments the invention may be otherwise embodied within the scope of the appended claims.

What is claimed is:

1. A toolholder, comprising:
    a pocket assembly having a nest section and a clamp section;
    an inverted nest mounted in the nest section, the inverted nest including an insert-receiving pocket for accommodating a cutting insert mounted therein; and
    a clamping wedge mounted in the clamp section in such a way that the cutting insert engages the clamping wedge,
    wherein the inverted nest includes one or more coolant grooves that cooperate with the cutting insert for directing super critical carbon dioxide to a cutting tool/workpiece interface.

2. The toolholder according to claim 1, wherein the insert-receiving pocket of the inverted nest includes a pair of side walls and a top wall to provide three-point contact between the cutting insert and the insert-receiving pocket when the cutting insert is mounted therein.

3. The toolholder according to claim 1, wherein the one or more coolant grooves are formed in a bottom surface of the inverted nest and cooperate with a top surface of the cutting insert when the cutting insert is mounted in the insert-receiving pocket of the inverted nest.

4. The toolholder according to claim 1, wherein the inverted nest further comprises an internal coolant passage extending from a coolant inlet port to a header in a forward nose portion of the inverted nest.

5. The toolholder according to claim 1, wherein a small distance exists between cutting edges of the cutting insert and side surfaces and the nose portion of the inverted nest for enabling coolant that exits the inverted nest to be directed to an underside of chip flow and aid in the evacuation of chips from the cutting insert/workpiece interface during a machining operation.

6. The toolholder according to claim 1, wherein the one or more grooves cooperate with the cutting insert so as to form an enclosed coolant channel therebetween.

7. The toolholder according to claim 6, wherein the enclosed coolant passage formed has an effective diameter of between about 0.006 in (0.152 mm) to about 0.010 in (0.254 mm).

8. The toolholder according to claim 1, wherein the nest section has a pair of side walls and a bottom wall.

9. The toolholder according to claim 8, wherein the nest section of the pocket assembly further comprises a corner relief formed between the side walls to provide clearance for the inverted nest when mounted therein.

10. The toolholder according to claim 1, wherein the clamp section further comprises a rear wall and a bottom wall for supporting the clamping wedge when mounted therein.

11. The toolholder according to claim 10, wherein the clamp section of the pocket assembly further comprises a radius formed between the rear wall and the bottom wall to provide clearance for the clamping wedge when mounted therein.

12. The toolholder according to claim 1, wherein the supercritical carbon dioxide is delivered to the cutting insert/workpiece interface at a temperature of about −78 degrees F. and a pressure of between about 1450 psi to about 2100 psi.

13. An inverted nest for a toolholder, comprising:
a top surface, a bottom surface opposite the top surface and a plurality of side surfaces; and
a forward nose portion with an insert-receiving pocket for accommodating a cutting insert mounted therein, the insert-receiving pocket including a pair of side walls and a top wall to provide three-point contact between the cutting insert and the insert-receiving pocket when the cutting insert is mounted therein,
wherein the top wall of the insert-receiving pocket of the inverted nest includes one or more coolant grooves that cooperate with the cutting insert for directing super critical carbon dioxide to a cutting tool/workpiece interface.

14. The inverted nest according to claim 13, wherein the side surfaces of the forward nose portion are formed at an angle with respect to a longitudinal axis of the inverted nest.

15. The inverted nest according to claim 13, wherein the inverted nest further comprises a side faceted surface at an intersection of two of the side surfaces, a rearward faceted surface at an intersection of two of the side surfaces and a side faceted surface at the intersection of two of the side surface.

16. A method for directing super critical carbon dioxide to a cutting insert/workpiece interface of a toolholder, the method comprising the step of:
mounting an inverted nest in a nest section of a pocket assembly of a toolholder, the inverted nest including an insert-receiving pocket for accommodating a cutting insert mounted therein; and;
mounting a clamping wedge in a clamp section of the pocket assembly of the toolholder in such a way that the cutting insert engages the clamping wedge,
wherein the inverted nest includes one or more coolant grooves that cooperate with the cutting insert for directing super critical carbon dioxide to a cutting tool/workpiece interface.

17. The method according to claim 16, wherein the one or more coolant grooves are formed in a top wall of the insert-receiving pocket of the inverted nest and cooperate with a top surface of the cutting insert when the cutting insert is mounted in the insert-receiving pocket of the inverted nest.

* * * * *